UNITED STATES PATENT OFFICE.

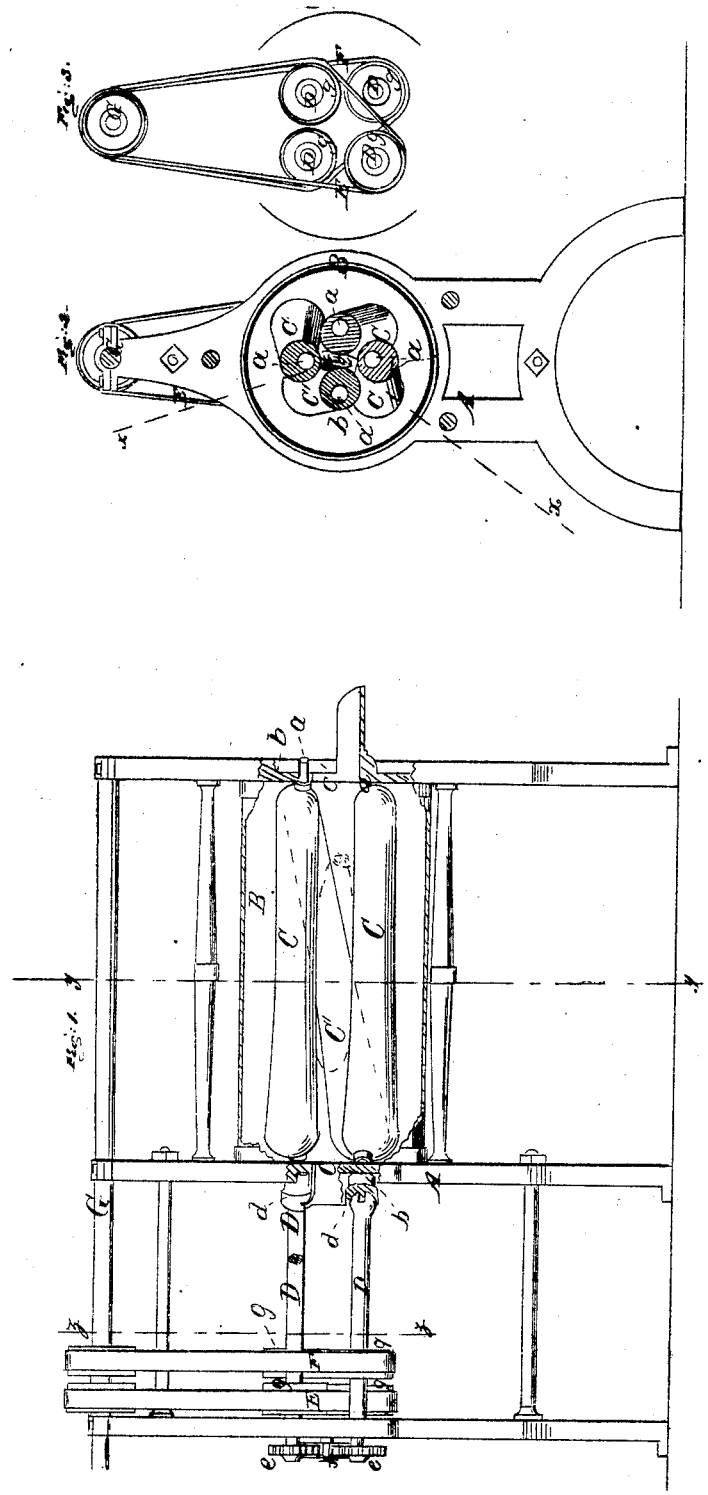

MARTIN R. LEMMAN, OF COLUMBUS, MISSISSIPPI.

MACHINERY FOR FELTING HAT-BODIES.

Specification of Letters Patent No. 28,185, dated May 8, 1860.

*To all whom it may concern:*

Be it known that I, M. R. LEMMAN, of Columbus, in the county of Lowndes and State of Mississippi, have invented a new and Improved Machine for Felting Hat-Bodies and other Woolen or Fur Articles; and I do hereby declare that the following is a full, clear, and exact description of the same, reference being had to the annexed drawings, making a part of this specification, in which—

Figure 1 is a side sectional view of my invention, taken in the line $x$, $x$, Fig. 2. Fig. 2, a transverse sectional view of the same, taken in the line $y$, $y$, Fig. 1. Fig. 3 a face view of the pulleys and belts by which the rollers are driven, the shafting being bisected as indicated by the line $z$, $z$, Fig. 1.

Similar letters of reference indicate corresponding parts in the several figures.

This invention relates to an improvement on a machine for shrinking or felting hat bodies, for which Letters Patent were granted to James S. Taylor May 3, 1853.

The object of the within described invention is to render the rollers, which constitute the essential feature of Taylor's machine, far more efficient than hitherto, by giving them an eccentric movement during their rotation.

To enable those skilled in the art to fully understand and construct my invention, I will proceed to describe it.

A represents a framing which may be constructed in any proper manner to support the working parts of the machine.

B, is a hollow cylinder which is placed horizontally in the framing A. Within the cylinder B there are four rollers C, C, C', C', which are placed eccentrically on their axis $a$. These rollers have an oblique position relatively with each other, as shown clearly in Fig. 2, and the rollers are so fitted in the cylinder as to allow a longitudinal opening or space between them. The axes of the rollers have their bearings in the cylinder heads $b$, $b$, and openings $c$, $c'$, are made in the heads, said openings being in line with the passage or space between the rollers, see Fig. 1. The upper and lower rollers C, C, have their axes in two horizontal planes, and the rollers C', C', have their axes in two vertical planes; the rollers gradually increase in diameter from their feed, to their discharge ends. The rollers C, C, correspond in eccentricity with each other, and so do the rollers C, C', the latter, however, as regards their eccentricity are placed in opposite position to the former, as shown clearly in Fig. 2.

The axes of the rollers are connected at one end to shafts D, by universal joints $d$, and the outer ends of shafts D, are each provided with a pinion $e$, which gear into a common central pinion $f$. Each shaft D, is also provided with a pulley $g$, around which belts E, F, from a driving shaft G, pass, the belt E passing around the pulleys which rotate the rollers C, C, and the belt F, passing around the pulleys which rotate the rollers C', C', see Fig. 3.

The operation of the machine is as follows. The shaft G, is rotated by any convenient power, and motion is communicated therefrom, to the shafts D, and rollers C, C, C', C', by the belts E, F. The hat bodies or other articles to be felted, and placed between the rollers C, C, C', C', at the opening $c'$ and the rotating movement of the rollers, in connection with their relatively oblique position one with another, cause the articles operated upon to be fed along between the rollers, and out through the opening $c$. The articles as they are fed along between the rollers are rotated and subjected to a pressure in consequence of the eccentric position of the rollers. The rollers C, C, and C', C', alternately acting on the articles. This pressure gradually increases from the feed to the discharge end of the rollers in consequence of the gradually increasing diameter of the same, and the pressure closely resembles that given by the manual process of felting; but, owing to the constant and uniform action of the rollers, it is much more efficient.

In order to insure the proper relative position of the rollers C, C, with C', C', and maintain the proper alternate pressing action of said rollers on the articles to be felted, the shafts are connected to the pinions $e$, and the latter made to gear into the central pinion $f$. This gearing precludes the possibility of any derangement of the rollers, while the universal joints $d$, which connect the axes of the rollers with the shafts D, admit of the parallelism of the latter, and the necessary obliquity of the former.

The rollers therefore may be rapidly driven, and the work performed by them rapidly executed.

I do not claim the employment or use of oblique rollers arranged to form a chamber or passage between them to receive articles and felt, or shrink the same, for such device has been previously used, in the patented machine alluded to, but not so arranged as to give a pressing action as herein described. Neither do I claim the universal joint connection as herein shown, for they may be seen in the aforesaid machine.

I claim therefore as new, and desire to secure by Letters Patent—

The placing of the rollers C, C, C', C', eccentrically on their axes $a$, substantially as herein shown and described, so that said rollers will act or press alternately in pairs on the article between them, for the purpose set forth.

MARTIN R. LEMMAN.

Witnesses:
ABM. MURDOCK,
GID B. WHITE.